(12) United States Patent
Levy et al.

(10) Patent No.: US 7,565,140 B2
(45) Date of Patent: Jul. 21, 2009

(54) DEVICE, SYSTEM AND METHOD OF PROCESSING RECEIVED WIRELESS SIGNALS

(75) Inventors: Shmuel Levy, Qiryat Tivon (IL); Shmuel Ravid, Haifa (IL); Gal Basson, Haifa (IL)

(73) Assignee: Intel Corporation, Santa Clara, CA (US)

( * ) Notice: Subject to any disclaimer, the term of this patent is extended or adjusted under 35 U.S.C. 154(b) by 599 days.

(21) Appl. No.: 11/320,502

(22) Filed: Dec. 29, 2005

(65) Prior Publication Data

US 2007/0155429 A1 Jul. 5, 2007

(51) Int. Cl.
*H04L 29/08* (2006.01)

(52) U.S. Cl. .............. 455/414.4; 455/432.2; 455/20; 455/22; 455/511; 370/470; 370/506; 702/127

(58) Field of Classification Search .......... 455/414.4, 455/432.2, 20, 22, 511, 118, 190, 313; 370/470, 370/506; 702/127
See application file for complete search history.

(56) References Cited

U.S. PATENT DOCUMENTS

| | | | |
|---|---|---|---|
| 6,191,906 B1 * | 2/2001 | Buch | 360/51 |
| 6,429,988 B1 * | 8/2002 | Bhaumik et al. | 360/46 |
| 6,643,323 B1 * | 11/2003 | Allred | 375/229 |
| 6,694,018 B1 * | 2/2004 | Omori | 379/406.03 |
| 6,751,510 B1 * | 6/2004 | Tan et al. | 700/41 |
| 6,889,172 B2 * | 5/2005 | Sierer et al. | 702/188 |
| 7,013,232 B2 * | 3/2006 | Fuller et al. | 702/123 |
| 7,016,811 B2 * | 3/2006 | Peck et al. | 702/188 |
| 7,043,393 B2 * | 5/2006 | Fuller et al. | 702/127 |
| 7,050,923 B2 * | 5/2006 | Fuller et al. | 702/123 |
| 7,197,418 B2 * | 3/2007 | Fuller et al. | 702/127 |
| 7,382,406 B2 * | 6/2008 | Higuchi | 348/241 |
| 7,430,524 B2 * | 9/2008 | Shah et al. | 705/26 |
| 2003/0036873 A1 * | 2/2003 | Sierer et al. | 702/123 |
| 2003/0036875 A1 * | 2/2003 | Peck et al. | 702/127 |
| 2003/0036876 A1 * | 2/2003 | Fuller et al. | 702/127 |
| 2003/0101022 A1 * | 5/2003 | Shah et al. | 702/186 |
| 2003/0122969 A1 * | 7/2003 | Higuchi | 348/607 |
| 2006/0009945 A1 * | 1/2006 | Fuller et al. | 702/127 |
| 2006/0093148 A1 * | 5/2006 | Ko et al. | 380/270 |
| 2008/0043821 A1 * | 2/2008 | Brockhage et al. | 375/150 |

(Continued)

OTHER PUBLICATIONS

IEEE-Std 802.11a-1999 Supplement to 802.11-1999: Wireless LAN MAC and PHY specifications: Higher speed Physical Layer (PHY) extension in the 5 GHz band.

(Continued)

*Primary Examiner*—Matthew D Anderson
*Assistant Examiner*—Minh D Dao
(74) *Attorney, Agent, or Firm*—Shiloh Peleg & Co.; Leason Ellis LLP

(57) ABSTRACT

Embodiments of the present invention provide a method, apparatus and system of processing received wireless signals. The apparatus, according to some demonstrative embodiments of the invention, may include a network interface configured to convert the received wireless signals into output signals to be provided to a host processor, the network interface having a first mode of operation, in which the output signals have base-band values corresponding to base-band values of the received signals, and a second mode of operation, in which the output signals have values representing a data frame of the received signals. Other embodiments are described and claimed.

22 Claims, 2 Drawing Sheets

U.S. PATENT DOCUMENTS

2008/0243022 A1* 10/2008 Donnett et al. .............. 600/544

OTHER PUBLICATIONS

IEEE-Std 802.11b-1999 Supplement to 802.11-1999, Wireless LAN MAC and PHY specifications: Higher speed Physical Layer (PHY) extension in the 2.4 GHz band.

IEEE-Std 802.11e-2005 Supplement to 802.11-1999, Wireless LAN MAC and PHY specification: Medium Access Control (MAC) Quality of Service (QoS) Enhancements.

IEEE-Std 802.11g-2003 Supplement to 802.11-1999, Wireless LAN MAC and PHY specifications: Further Higher Data Rate Extension in the 2.4 GHz band, Draft 8.2.

* cited by examiner

DEVICE, SYSTEM AND METHOD OF PROCESSING RECEIVED WIRELESS SIGNALS

BACKGROUND OF THE INVENTION

A wireless communication system may include a plurality of wireless communication platforms. A wireless platform may include a wireless interface, e.g., a Network Interface Card (NIC) to communicate with one or more other wireless communication platforms.

The wireless platform may also include one or more devices, e.g., processors, clocks circuits, and/or wireless devices, which may cause mutual Radio Frequency Interference (RFI). The mutual RFI may reduce the performance (throughput) of the wireless communication system.

During production, a manufacturer of the wireless platform may measure the mutual RFI and/or reconfigure the wireless platform according to the measured mutual RFI, e.g., using external test equipment. The test equipment may be expensive. In addition, the use of the external test equipment for measuring the mutual RFI may slow down the platform production process.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof may best be understood by reference to the following detailed description when read with the accompanied drawings in which:

Figure 1:
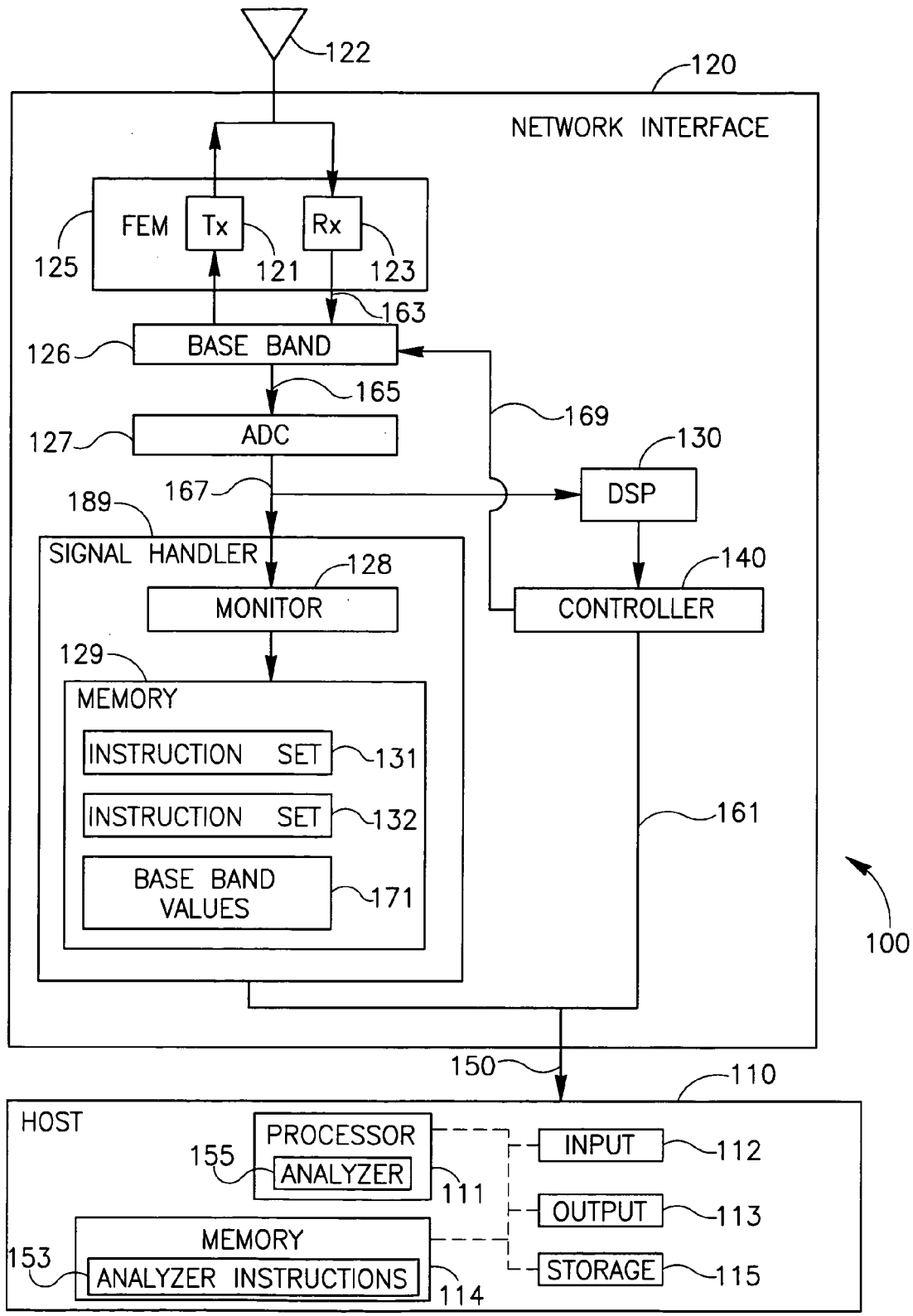
FIG. 1 is a schematic block diagram illustration of a wireless communication device including a network interface, in accordance with some demonstrative embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF SOME DEMONSTRATIVE EMBODIMENTS OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

It should be understood that some demonstrative embodiments of the invention may be used in a variety of applications. Although the invention is not limited in this regard, some demonstrative embodiments of the invention may be used in conjunction with many apparatuses, for example, a transmitter; a receiver; a transceiver; a transmitter-receiver; a wireless communication station (STA); a wireless communication device; a wireless Access Point (AP); a modem; a wireless modem; a personal computer; a desktop computer; a mobile computer; a laptop computer; a notebook computer; a Personal Digital Assistant (PDA) device; a tablet computer; a server computer; a network; a wireless network; a Local Area Network (LAN); a Wireless LAN (WLAN); devices and/or networks operating in accordance with existing standards, e.g., "IEEE-Std 802.11, 1999 Edition (ISO/IEC 8802-11: 1999)" ("the 802.11 standard"), and more particularly "IEEE-Std 802.11a-1999 Supplement to 802.11-1999: Wireless LAN MAC and PHY specifications: Higher speed Physical Layer (PHY) extension in the 5 GHz band", "IEEE-Std 802.11b-1999 Supplement to 802.11-1999, Wireless LAN MAC and PHY specifications: Higher speed Physical Layer (PHY) extension in the 2.4 GHz band", "IEEE-Std 802.11e-2005 Supplement to 802.11-1999, Wireless LAN MAC and PHY specifications: Medium Access Control (MAC) Quality of Service (QoS) Enhancements", "IEEE-Std 802.11g-2003 Supplement to 802.11-1999, Wireless LAN MAC and PHY specifications: Further Higher Data Rate Extension in the 2.4 GHz band, Draft 8.2". "IEEE-Std 802.11n—High throughput extension to the 802.11" standard, and the like, and/or future versions of the above standards; a Personal Area Network (PAN); a Wireless PAN (WPAN); units and/or devices which are part of the above WLAN and/or PAN and/or WPAN networks; one way and/or two-way radio communication systems; cellular radio-telephone communication systems; a cellular telephone; a wireless telephone, a Personal Communication Systems (PCS) device; a PDA device which incorporates a wireless communication device; a Multiple Input Multiple Output (MIMO) transceiver or device; a Single Input Multiple Output (SIMO) transceiver or device; a Multiple Input Single Output (MISO) transceiver or device; a Multi Receiver Chain (MRC) transceiver or device; a transceiver or device having "smart antenna" technology or multiple antenna technology; or the like.

Some demonstrative embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), or the like. Some demonstrative embodiments of the invention may be used in various other apparatuses, devices, systems and/or networks.

Although some demonstrative embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes. In addition, the term "plurality" may be used throughout the specification to describe two or more components, devices, elements, parameters and the like.

Some embodiments of the invention may be implemented, for example, using a machine-readable medium or article which may store an instruction or a set of instructions that, if executed by a machine, cause the machine to perform a method and/or operations in accordance with some demonstrative embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit (e.g., memory unit 114 or storage unit 115) memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Reference is made to FIG. 1, which schematically illustrates a wireless communication device 100 including a network interface 120, in accordance with some demonstrative embodiments of the invention.

According to some demonstrative embodiments of the invention, device 100 may be part of a wireless communication system, e.g., a WLAN system. Although the scope of the present invention is not limited in this respect, device 100 may perform the functionality of an AP or a station, e.g., as are defined by the 802.11 standard.

According to some demonstrative embodiments of the invention, device 100 may also include a host 110 associated with a network interface 120, e.g., via a connection 150, as are described in detail below.

In some embodiments, host 110 may include or may be, for example, a computing platform, e.g., a personal computer, a desktop computer, a mobile computer, a laptop computer, a notebook computer, a terminal, a workstation, a server computer, a PDA device, a tablet computer, a network device, or other suitable computing device.

According to some demonstrative embodiments of the invention, host 110 may include a processor 111 associated with a memory 114. Processor 111 may include, for example, a Central Processing Unit (CPU), a microprocessor, a host processor, a plurality of processors, a controller, a chip, a microchip, or any other suitable multi-purpose or specific processor or controller. Memory 114 may include, for example, a Random Access Memory (RAM), a Dynamic RAM (DRAM), a Synchronous DRAM (SD-RAM), a Flash memory, a volatile memory, a non-volatile memory, a cache memory, a buffer, a short term memory unit, a Read Only Memory (ROM), a long term memory unit, or other suitable memory units or storage units.

According to some demonstrative embodiments of the invention, host 110 may also include an input unit 112, an output unit 113, and/or a storage unit 115. Host 110 may include, additionally or alternatively, other suitable hardware components and/or software components.

Input unit 112 may include, for example, a keyboard, a keypad, a mouse, a touch-pad, or other suitable pointing device or input device. Output unit 113 may include, for example, a screen, a monitor, a speaker, a Cathode Ray Tube (CRT) monitor or display unit, a Liquid Crystal Display (LCD) monitor or display unit, or other suitable monitor or display unit.

Storage unit 115 may include, for example, a hard disk drive, a floppy disk drive, a Compact Disk (CD) drive, a CD-ROM drive, or other suitable removable or non-removable storage units.

According to some demonstrative embodiments of the invention, network interface 120 may include a Front End Module (FEM) 125. FEM 125 may include, for example, a receiver 123 to receive wireless signals, e.g., via at least one antenna 122. Receiver 123 may include any suitable receiver, e.g., a Radio Frequency (RF) receiver as is known in the art. Receiver 123 may generate signals 163 corresponding to the received signals.

Although the invention is not limited in this respect, FEM 125 may also include, for example, a transmitter 121 to transmit wireless signals, e.g., via antenna 122 as is known in the art. Transmitter 121 may include any suitable transmitter, e.g., a RF transmitter as is known in the art. FEM 125 may also include any other suitable component, e.g., amplifier(s) for signal amplifications, and/or any other suitable component, which may be used for receiving and/or transmitting wireless signals. For example, FEM 125 may include hardware for determining Video-Bandwidth of a wireless signal and performing smoothing over time of the wireless signal by interpolation, e.g., as known in the art.

Antenna 122 may include an internal and/or external RF antenna, for example, a dipole antenna, a monopole antenna, an omni-directional antenna, an end fed antenna, a circularly polarized antenna, a micro-strip antenna, a diversity antenna, or any other type of antenna suitable for transmitting and/or receiving wireless communication signals, blocks, frames, transmission streams, packets, messages and/or data.

According to some embodiments of the invention, transmitter 121 and receiver 123 may be implemented as a transceiver, a transmitter-receiver, or one or more units able to perform separate or integrated functions of transmitting and/or receiving wireless communication signals, blocks, frames, transmission streams, packets, messages and/or data.

According to some demonstrative embodiments of the invention, interface 120 may also include a Base-Band (BB) module 126, an Analogue to Digital Converter (ADC) 127, a signal handler 189, a signal processor 130, and/or a controller 140, as are described in detail below.

According to some demonstrative embodiments of the invention, device 100 may be configured to convert the received wireless signals into output signals 161 to be provided to host 110, e.g., as described in detail below.

According to some demonstrative embodiments of the invention, network interface 120 may have a first mode of operation, in which output signals 161 may have base-band values corresponding to base band values of the received wireless signals; and a second mode of operation, in which signals 161 may have values representing data frames of the received wireless signals, e.g., as described in detail below. Although the invention is not limited in this respect, in the second mode of operation network interface 120 may perform the functionality of a Network Interface Card, e.g., in accordance with the 802.11 standard and/or any other suitable communication standard.

According to some demonstrative embodiments of the invention, base-band module 126 may convert signals 163 into base-band signals 165 having base-band values corresponding to the received wireless signals. Base-band module 116 may include any suitable base-band hardware and/or software, for example, a radio chip as is known in the art.

According to some demonstrative embodiments of the invention, base-band module 126 may sample signals 163, and/or apply a gain to signals 163, e.g., in accordance with one or more conversion parameters 169 which may be received, for example, from controller 140. The conversion parameters may include, for example, a sampling rate for sampling signals 163, a gain to be applied to signals 163, a frequency for sampling signals 163, and/or any other suitable base-band conversion parameter, e.g., as are known in the art.

According to some demonstrative embodiments of the invention, ADC 127 may include any suitable ADC hardware and/or software, e.g., as is known in the art, to convert base-band signals 165 into digital base-band signals 167.

According to some demonstrative embodiments of the invention DSP 130 may determine frame values representing one or more data frames of the received signals based on base-band signals 167, e.g., in accordance with the 802.11 standard. DSP 130 may include any suitable DSP, e.g., as is known in the art. DSP 130 may also provide the frame values to an Rx queue (not shown) of controller 140, e.g., as is known in the art. The frame values may then be provided to host 110, e.g., using signals 161.

According to some demonstrative embodiments of the invention, controller 140 may include any suitable wireless communication controller to control transmission over a wireless communication channel. For example, controller 140 may include a Media Access Controller (MAC), e.g., as defined by the 802.11 standard and/or any other suitable communication standard or protocol.

According to some demonstrative embodiments of the invention, controller 140 may execute one or more controller instructions which may be stored in a memory, as is known in the art. The controller instructions may be stored, for example, in a memory 129, as is described, below with reference to signal handler 189. In other embodiments, the controller instructions may be stored in another memory, e.g., separate from memory 129.

According to some demonstrative embodiments of the invention, processor 111 may load the controller instructions to memory 129. For example, processor 111 may load to memory 129 a first set of controller instructions 131, e.g., in the first mode of operation; and a second set of controller instructions 132, e.g., in the second mode of operation.

According to some demonstrative embodiments of the invention, instructions 131, when executed by control controller 140, e.g., in the first mode of operation, may result in controller 140 controlling base-band module 126 to convert signals 163 into base band signals 167 according to one or more user-defined conversion parameters. For example, in the first mode of operation one or more of conversion parameters 169 may be determined by a user of device 100. For example, controller 140 may provide bas-band module 126 with conversion parameters 169 representing a user-defined gain to be applied to signals 163, a user-defined frequency for sampling signals 163, a user-defined sampling rate for sampling signals 163, and/or any other user-defined conversion parameter, e.g., as described below.

According to some demonstrative embodiments of the invention, instructions 132, when executed by control controller 140, e.g., in the second mode of operation, may result in controller 140 controlling base-band module 126 to convert signals 163 into base band signals 167 according to a predetermined communication protocol, e.g., in compliance with the 802.11 standard. For example, in the second mode of operation controller 140 may be able to determine one or more of conversion parameters 169 in accordance with the predetermined communication protocol. For example, controller 140 may determine the gain to be applied to signals 163, e.g., based on a suitable automatic-gain control algorithm as is known in the art; a frequency for sampling signals 163, e.g., based on the predetermined protocol; and/or a predetermined sampling rate for sampling signals 163, e.g., according to the predetermined protocol. The second set of controller instructions may include any suitable controller instructions, e.g., Lower MAC (LMAC) instructions, as are known in the art.

According to some demonstrative embodiments of the invention, controller instructions 131 may include instructions relating to a smaller number of operations, e.g., compared to controller instructions 132. For example, instructions 131 may not include, instructions resulting in an algorithm for performing Complimentary Code Keying coding block (CCK), an AGC algorithm, an algorithm to automatically select a specific frequency and/or band-pass of signals 163, e.g., as are known in the art.

According to some demonstrative embodiments of the invention, signal handler 189 may generate signals 161 including values corresponding to base-band signals 167, for example, during the first mode of operation of interface 120, e.g., as described below.

According to some demonstrative embodiments of the invention, signal handler 189 may include a monitor 128 and memory 129, as are described in detail below.

Memory 129 may include, for example, a Random Access Memory (RAM), a Dynamic RAM (DRAM), a Synchronous DRAM (SD-RAM), a Flash memory and/or any other suitable memory unit or storage unit.

According to some demonstrative embodiments of the invention monitor 128 may monitor the output of ADC 127, and store in memory 129 one or more base-band values corresponding to base band signals 167 generated by ADC 127, e.g., in the first mode of operation. The stored base-band values may be provided to processor 111 using signals 161, e.g., as described below.

According to some demonstrative embodiments of the invention, memory 114 may store one or more spectrum analysis instructions 153, which when executed by processor 114 may result in an analysis application 155. Application 155 may enable the user of host 110 to perform a spectrum analysis method corresponding to the received wireless signals, e.g., as described below with reference to FIG. 2.

According to some demonstrative embodiments of the invention, application 155 may receive from the user of host 110 an instruction to switch interface 120 to the first mode of operation, e.g., via input 112. For example, application 155 may store instructions 131 in memory 129. The user may then provide application 155 with one or more of the user-defined conversion parameters, e.g., the gain control, the sampling frequency, and/or the sampling rate, to be applied to the wireless signals received by interface 120. Application 155 may provide the user-defined conversion parameters to controller 140, e.g., by loading the user-defined parameters to memory 129. Controller 140 may control base-band module 116 to convert signals 163 into signals 167, which may have base-band values corresponding to the user-defined parameters. Monitor 128 may store the signals 167 in memory 129.

According to some demonstrative embodiments of the invention, application 155 may store signals 161 in memory 114, e.g., in the first mode of operation.

According to some demonstrative embodiments of the invention, processor 111 may process the base-band values of signals 167 in accordance with a spectrum analysis algorithm, e.g., any suitable analysis algorithm as is known in the art. For example, processor 111 may apply a Fourier transform to the base-band values of signals 167, e.g., in order to represent the base-band values of the received wireless signals in the frequency domain.

According to some demonstrative embodiments of the invention, processor 111 may also provide the user with an output corresponding to the base-band values of signals 167. For example, processor 111 may display on output 113 a plot representing the received wireless signals in the frequency domain.

Figure 2:
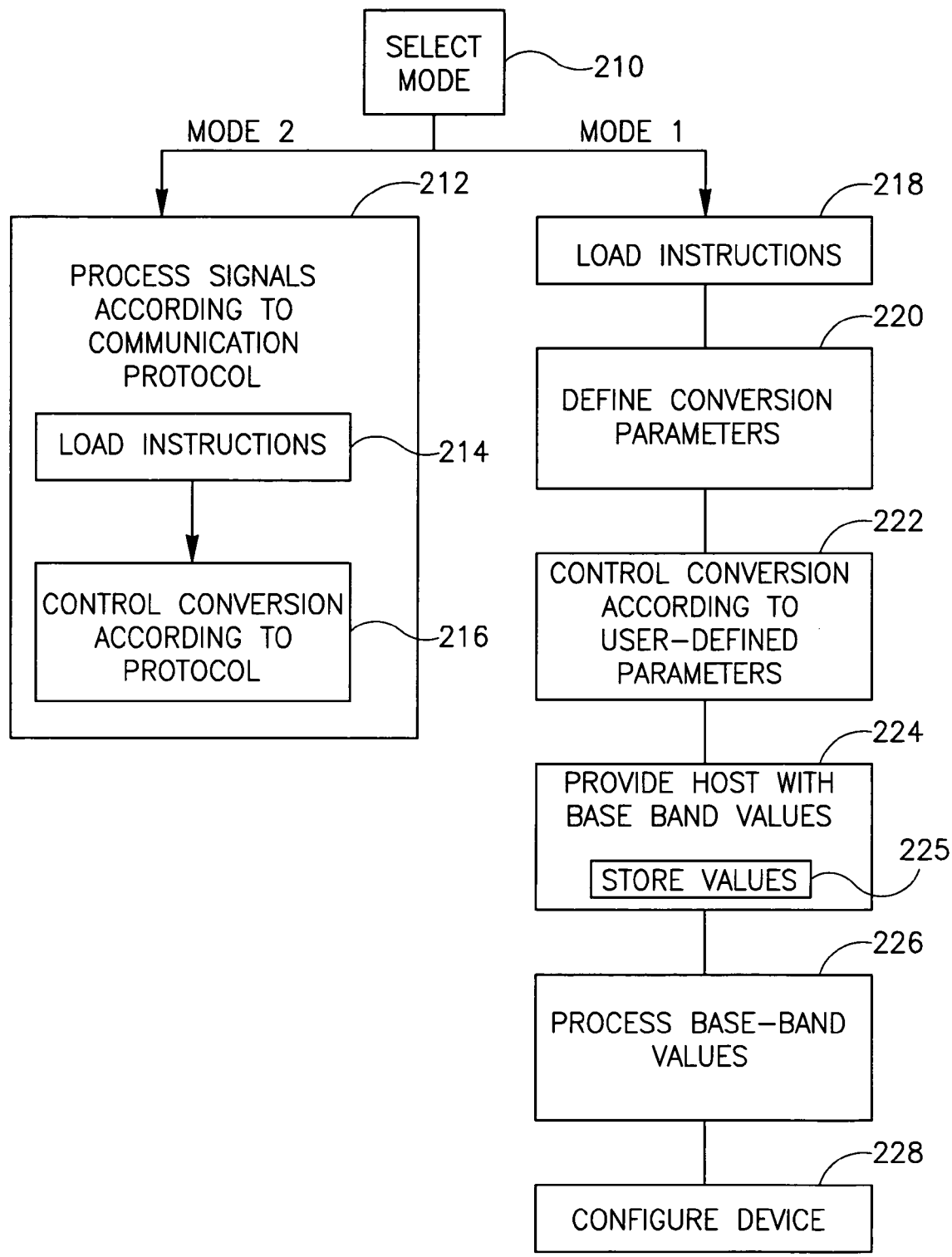
FIG. 2 is a schematic flow-chart illustration of a method of processing received wireless signals, in accordance with some demonstrative embodiments of the invention.

Reference is made to FIG. 2, which schematically illustrates a method of processing received wireless signals, in accordance with some demonstrative embodiments of the invention. Although the invention is not limited in this respect, one or more operations of the method of FIG. 2 may be implemented, for example, by device 100 (FIG. 1).

As indicated at block 210, according to some demonstrative embodiments of the invention the method may include selecting a mode of operation of an interface device. For example, the user of host 110 (FIG. 1) may instruct application 155 (FIG. 1) to select the first mode of operation, e.g., using input 112 (FIG. 1).

As indicated at block 212 the method may also include processing the received wireless signals according to a predetermined communication protocol, e.g., if the second mode of operation is selected. For example, as indicated at block 214, the method may include loading instructions 132 to memory 129. As indicated at block 216, the method may also include controlling the conversion of the wireless received signals into bas-band signals according to the communication protocol.

As indicated at block 218, the method may include loading instructions 132 to memory 129, e.g., if the first mode of operation is selected.

As indicated at block 220, the method may also include defining one or more user-defined conversion parameters. For example, application 155 may receive from the user one or more of the user-defined parameters, e.g., via input 112. The user-defined parameters may include any suitable parameters, e.g., as described above.

As indicated at block 222, the method may also include controlling the conversion of the received wireless signals into bas-band signals according to the user-defined parameters, e.g., as described above with reference to FIG. 1.

As indicated at block 224, the method may also include providing a host with base-band values corresponding to the received signals. As indicated at block 225, providing the host with the base-band values may include, for example, storing the base-band values, e.g., before providing the base-band values to the host. For example, monitor 128 (FIG. 1) may store bas-band values corresponding to base-band signals 167 (FIG. 1) in memory 129 (FIG. 1). The base-band values may be provided to host 110 (FIG. 1), e.g., using signals 161 (FIG. 1). For example, application 155 (FIG. 1) may store the base-band values of signals 161 (FIG. 1) in memory 114 (FIG. 1).

As indicated at block 226, the method may also include processing the base-band values received from the network interface. For example, application 155 (FIG. 1) may apply a Fourier transform to the base-band values.

As indicated at block 228, the method may also include configuring the host in accordance with the processed base-band values. For example, device 100 (FIG. 1) may be configured, e.g., to reduce a mutual Radio Frequency Interference level as is known in the art.

Some embodiments of the invention may be implemented by software, by hardware, or by any combination of software and/or hardware as may be suitable for specific applications or in accordance with specific design requirements. Some demonstrative embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
   a host processor;
   a network interface to select a mode of operation based on instructions received from the host processor to convert received wireless signals into output signals to be provided to the host processor, wherein in a first mode of operation used to configure the apparatus, said output signals have base-band values corresponding to base-band values of the received signals, the host processor processes the base-band values and the apparatus is configured based on the processed base-band values and in a second mode of operation said output signals have values representing a data frame of the received signals.

2. The apparatus of claim 1, wherein said network interface comprises:
   a base-band module to convert the received wireless signals into base-band signals; and
   a controller to control said base-band module to convert the received signals into said base band signals according to one or more user-defined conversion parameters in the first mode of operation of the network interface, and to convert the received signals into said base band signals according to a communication protocol in the second mode of operation of the network interface.

3. The apparatus of claim 2, wherein said user-defined conversion parameters comprise at least one of a user-defined sampling rate of said received signals, a user-defined frequency for sampling said received signals, and a user defined gain to be applied to said received signals.

4. The apparatus of claim 2, wherein said communication protocol comprises a predetermined gain-control algorithm and a predetermined sampling rate.

5. The apparatus of claim 2, wherein said network interface comprises:
   a signal processor to determine the values representing the data frame of the received signals.

6. The apparatus of claim 2, wherein said network interface comprises:
   a signal handler to provide said host processor with said base-band signals during said first mode of operation.

7. The apparatus of claim 6, wherein said signal handler comprises:
   a memory accessible by said host processor; and
   a monitor to store in said memory the base-band values of the base-band signals received during said first mode of operation.

8. A system comprising:
   a dipole antenna;
   a host processor; and a network interface configured to select a mode of operation based on instructions received from the host processor and to convert in a selected mode of operations received wireless signals into output signals to be provided to the host processor, wherein in a first mode of operation used to configure the apparatus, said output signals have base-band values corresponding to base-band values of the received signals, the host processor processes the base-band values and the apparatus is reconfigured based on the processed base-band values and in a second mode of operation said output signals have values representing a data frame of the received signals.

9. The system of claim 8, wherein said network interface comprises:
   a base-band module to convert the received wireless signals into base-band signals;
   a controller to control said base-band module to convert the received signals into said base band signals according to one or more user-defined conversion parameters in the first mode of operation of the network interface, and to convert the received signals into said base band signals according to a communication protocol in the second mode of operation of the network interface.

10. The system of claim 9, wherein said network interface comprises a memory accessible by said host processor and said controller, and wherein said host processor is able to store in said memory one or more instructions readable by said controller that when executed by said controller result in controlling said base-band module to convert the received signals into said base band signals according to said user-defined conversion parameters.

11. The system of claim 9, wherein said user-defined conversion parameters comprise at least one of a user-defined sampling rate of said received signals, a user-defined frequency for sampling said received signals, and a user defined gain to be applied to said received signals.

12. The system of claim 9, wherein said communication protocol comprises a predetermined gain-control algorithm and a predetermined sampling rate.

13. The system of claim 9, wherein said network interface comprises:
   a signal processor to determine the values representing the data frame of the received signals.

14. The system of claim 9, wherein said host processor provides said user-defined conversion parameters to said controller.

15. The system of claim 9, wherein said network interface comprises:
   a signal handler to provide said host processor with said base-band signals during said first mode of operation.

16. The system of claim 15, wherein said signal handler comprises:
   a memory accessible by said host processor; and
   a monitor to store in said memory the base-band values of the base-band signals received during said first mode of operation.

17. The system of claim 8, wherein said host processor is able to process said base-band values according to a spectral-analysis algorithm.

18. A method comprising:
   selecting for a network interface coupled to a host processor within a wireless device a first mode of operation for configuring the wireless device;
   controlling the network interface to convert according to one or more user-defined parameters the received wireless signals into base-band signals having base-band values corresponding to the received signals;
   providing the host processor with the base band values for processing; and
   re-configuring the host processor based on processed based band values, wherein in a second operational mode, said network interface is able to convert said received signals into output signals having values representing a data frame of the received signals.

19. The method of claim 18, wherein configuring comprises:
   configuring the host processor to reduce mutual radio frequency (RF) interference level.

20. The method of claim 19, wherein converting said received signals comprises converting said received signals according to at least one of a user-defined sampling rate of said received signals, a user-defined frequency for sampling said received signals, and a user defined gain to be applied to said received signals.

21. The method of claim 18 comprising storing said base-band signals in a memory accessible by the host processor.

22. The method of claim 18 comprising processing said base-band values according to a spectral-analysis algorithm.

* * * * *